United States Patent [19]

Sato et al.

[11] Patent Number: 5,398,155
[45] Date of Patent: Mar. 14, 1995

[54] ELECTRIC DOUBLE LAYER CAPACITORS

[75] Inventors: Kazuhiko Sato; Munekazu Aoki, both of Japan

[73] Assignee: NEC Corporation, Japan

[21] Appl. No.: 72,419

[22] Filed: May 25, 1993

[30] Foreign Application Priority Data

May 27, 1992 [JP] Japan .................. 4-134574

[51] Int. Cl.⁶ ............................................. H01G 9/00
[52] U.S. Cl. ................................................ 361/502
[58] Field of Search .................. 361/502, 528, 532; 29/25.03, 25.42

[56] References Cited

U.S. PATENT DOCUMENTS

| | | | |
|---|---|---|---|
| 3,536,963 | 10/1970 | Boos | 361/502 |
| 4,757,424 | 7/1988 | Morimoto et al. | 361/502 |
| 5,038,249 | 8/1991 | Rounds | 361/502 |
| 5,093,762 | 3/1992 | Sato et al. | 361/502 |

FOREIGN PATENT DOCUMENTS

| | | | |
|---|---|---|---|
| 0289920 | 11/1988 | Japan | 361/502 |
| 4026106 | 1/1992 | Japan | 361/502 |

*Primary Examiner*—Bruce A. Reynolds
*Assistant Examiner*—Michael D. Switzer
*Attorney, Agent, or Firm*—Laff, Whitesel, Conte & Saret, Ltd.

[57] ABSTRACT

A pair of electrode plates each having a lead terminal, which are disposed on opposite polar faces of a stacked electric double layer capacitor element, are made of a stainless steel plate or 42% nickel-iron steel plate, whereby a thickness of the electrode plate is reduced as compared with that in SPCC and thus a thickness of the capacitor is shrunk.

8 Claims, 7 Drawing Sheets

ELECTRIC DOUBLE LAYER CAPACITORS

BACKGROUND OF THE INVENTION

1. Field of the Invention

The present invention relates to an electric double layer capacitor and in particular to a material for an electrode plate which is used in the electric double layer capacitor.

In the following specification and claims, it will be convenient to refer to specific steel and iron materials. There are a variety of numbers which identify the same specific iron and steel materials according to standards identified in various systems throughout the world, as set forth in the following table:

| UNS | American Iron And Steel Institute "AISI" | Japanese Standards | ISO |
| --- | --- | --- | --- |
| S43000 | 430 | SUS430 | 8,H4 (1) |
| S30100 | 301 | SUS301 | 14 |

Where: "UNS" is a U.S. standard and "ISO" is international organization for standardizations.

Hence, for example, the same material is variously known as: S43000, 430, SUS 430, and 8,H4(1). It is also possible to show a material in a group of materials. For example, "SUS430 (JIS G 4305)" means that "SUS430" is a material in a group "JIS G 4305" of materials.

2. Description of the Related Art

As for a capacitor having a large capacitance while making use of an electric double layer, there has been known, as disclosed in, for instance, U.S. Pat. No. 3,536,963, the disclosure of which is hereby incorporated by reference herein, a capacitor having a large capacitance in which an electric double layer is formed by coming carbon powder in contact with an electrolyte.

Figure 1:
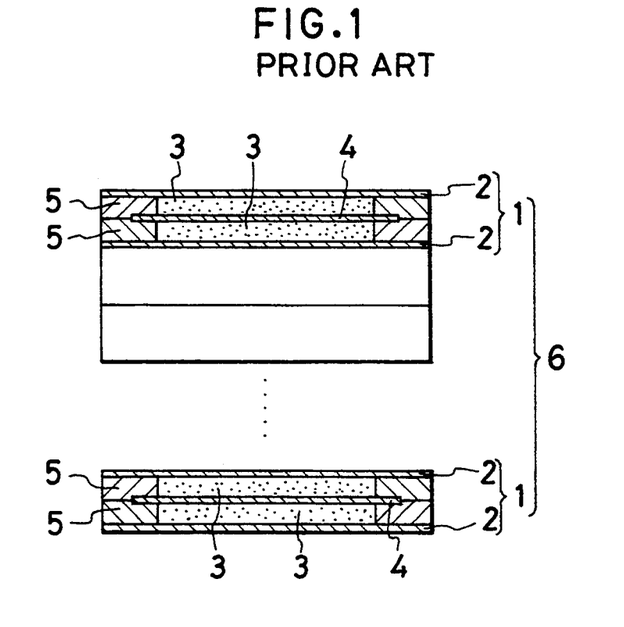
FIG. 1 is a cross-sectional view for explaining a conventional electric double layer capacitor element and stacked element.
Figure 2:
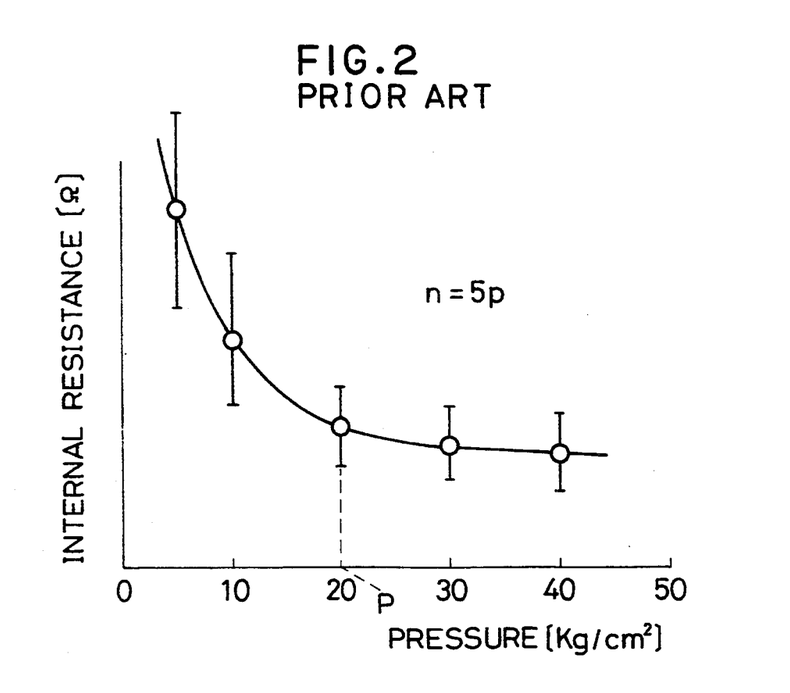
FIG. 2 is a graph showing dependency of internal resistance of a conventional stacked electric double layer capacitor element on pressures.

Referring now to FIG. 1, there is shown a sectional view of a unitary electric double layer capacitor element (hereinafter referred to as "element") 1 and a stacked element 6. The element 1 has a pair of electronic conducting and ionic insulating plastic films 2, a pair of carbon paste electrodes 3 each comprising a mixture of activated carbon powder and dilute sulfuric acid and arranged between these two plastic films 2, an ionic conducting and electronic insulating porous separator 4 which is positioned for preventing the electric conduction between the carbon paste electrodes 3, and non-conductive rubber gaskets 5 for holding the carbon paste electrodes 3 and for isolating the electrodes 3 from the outside. Maximum permissible voltage of the element 1 depends on electrolytic voltage of dilute sulfuric acid used for an electrolyte and thus in order to obtain a desired maximum permissible voltage, a plurality of elements are in series stacked to form the stacked element 6. The stacked element 6 thus formed has internal resistance including contact resistance among activated carbon particles within the carbon paste electrodes 3 of the element 1, contact resistance between adjacent elements 1 and so on since the stacked element 6 comprises a multilayer body of the element 1 having the above-mentioned structure. The internal resistance depends on pressures applied to the stacked element 6 from its upper and lower sides. In order to stabilize the internal resistance, as shown in FIG. 2, it is necessary to apply pressures of P (about 20 kg/cm$^2$) or more thereto. FIG. 2 is a graph showing dependency of internal resistance of a conventional stacked element on pressures. Values of internal resistance ($\Omega$) vary depending on a shape and size of the stacked element but a relation between the internal resistance and the pressure shows a similar tendency as shown in FIG. 2. Thus, the internal resistance is stabilized by applying pressures of about 20 kg/cm$^2$ or more to the stacked element.

Figure 3A:
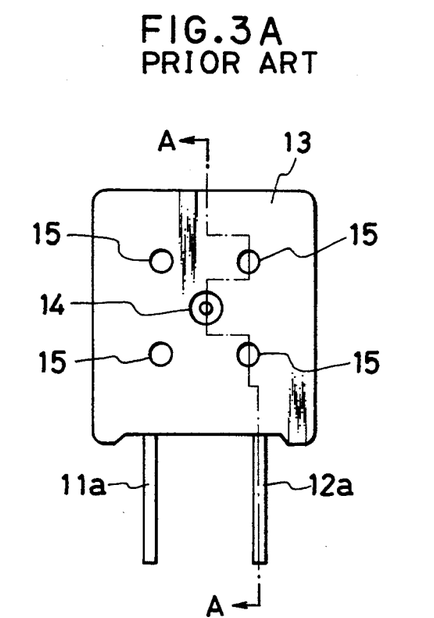
FIG. 3A is a front view thereof.
Figure 3B:
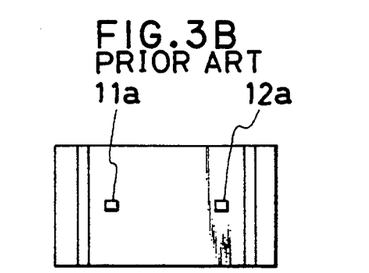
FIG. 3B is an underside view thereof.
Figure 3C:
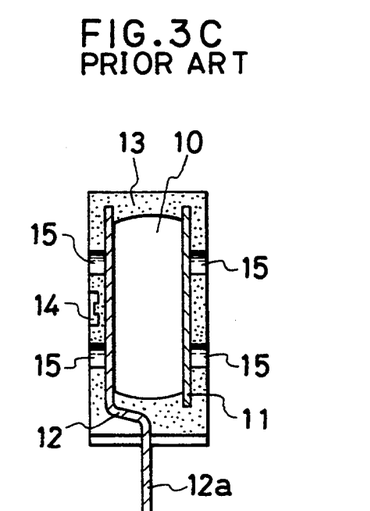
FIG. 3C is a cross-sectional view taken along a line A—A of FIG. 3A.
Figure 3D:
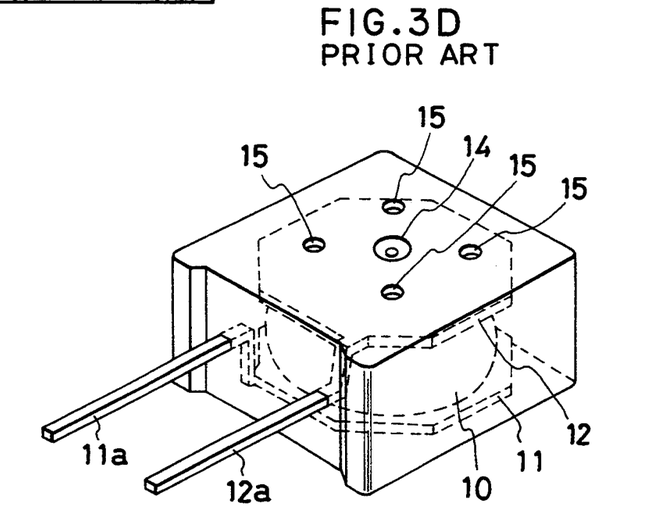
FIG. 3D is an oblique perspective view thereof.

Referring now to FIGS. 3A to 3D, there are shown a front view (FIG. 3A) of a conventional radial type electric double layer capacitor, an underside view (FIG. 3B) thereof, a cross-sectional view (FIG. 3C) taken along a line A—A of FIG. 3A and an oblique view thereof (FIG. 3D).

As shown in those drawings, a stacked element 10 is sandwiched between a first electrode plate 11 having a lead terminal 11a and a second electrode plate 12 having a lead terminal 12a, and the resulting assembly is placed in a mold and is controlled to a fixed size through the both electrode plates 11 and 12 by means of pressure pins (not shown) provided on the mold in order to stabilize internal resistance. Applied pressure is set to be of about 20 to 50 kg/cm$^2$ considering variation in a thickness of the stacked element 10. While applying the pressure to the stacked element 10, molten thermoplastic resin PBT (polybutylene terephthalate) 13 is injected into the mold through a gate 14 for injecting the resin under injection pressure of about 50 kg/cm$^2$, hardened under cooling to be molded and packaged. After molding, the pressure pins are removed to leave holes 15 in their places.

Figure 4A:
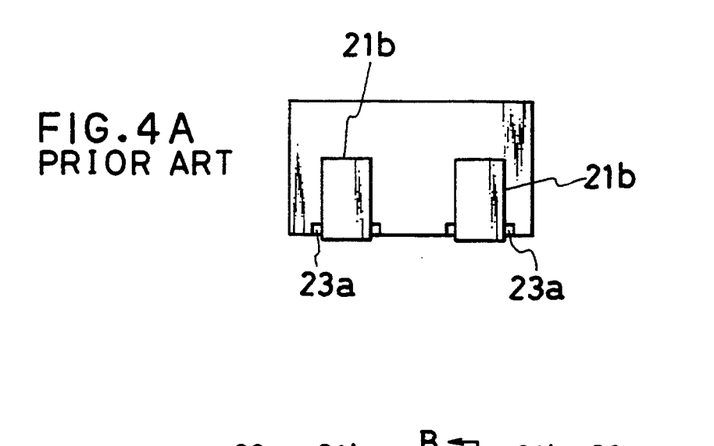
FIG. 4A is a top view thereof.
Figure 4B:
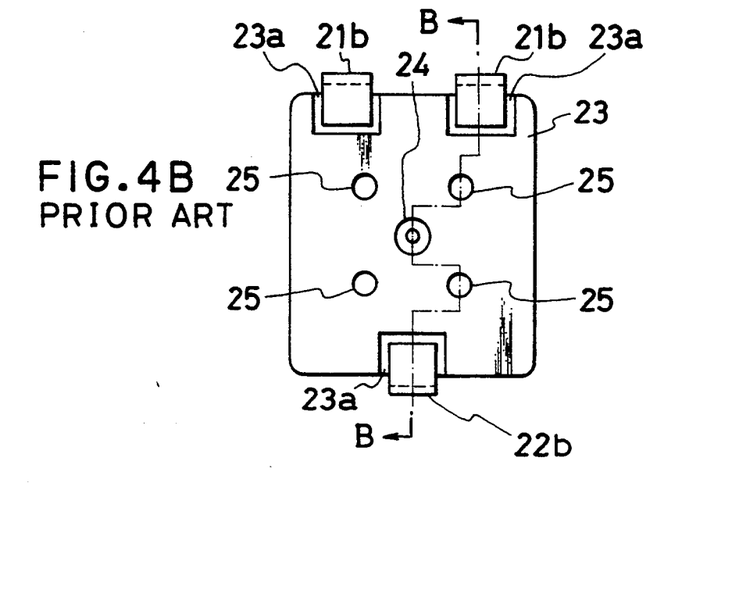
FIG. 4B is a front view thereof.
Figure 4C:
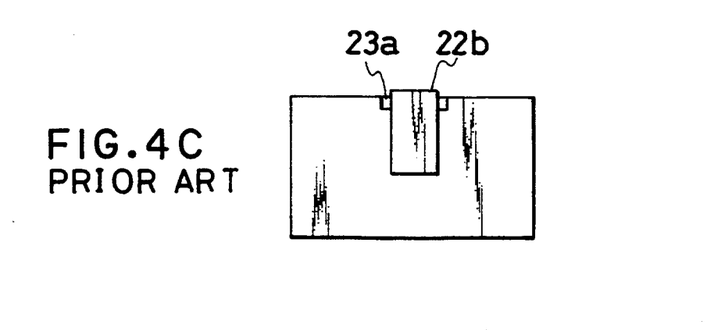
Figure 4D:
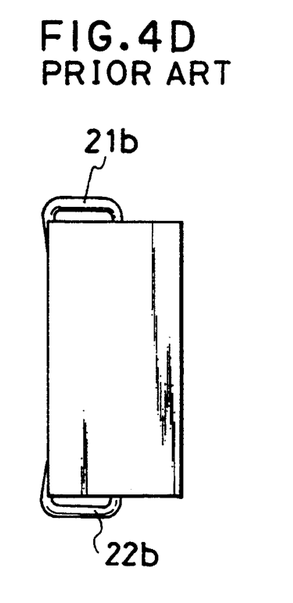
FIG. 4D is a right side view thereof.
Figure 4E:
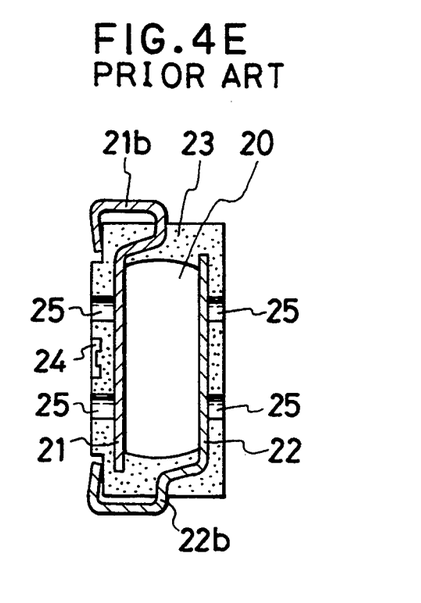
FIG. 4E is a cross-sectional view taken along a line B—B of FIG. 4B and an oblique perspective view thereof after molding.
Figure 4F:
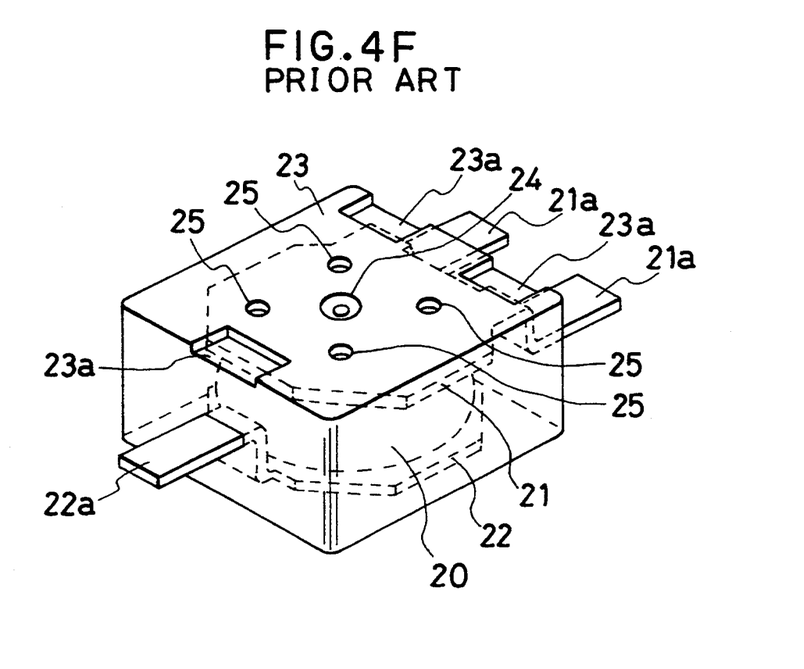

Referring now to FIGS. 4A to 4F, there are shown a top view (FIG. 4A), a front vies (FIG. 4B), an underside view (FIG. 4C) and a right side view (FIG. 4D) of a conventional chip type electric double layer capacitor, a cross-sectional view (FIG. 4E) taken along a line B—B of FIG. 4B, and an oblique view (FIG. 4F) thereof after molding.

As shown in those drawings, a stacked element 20 is sandwiched between a first electrode plate 21 having two lead terminal 21a at the same side and a second electrode plate 22 having a lead terminal 22a, and the resulting assembly is placed in a mold and is controlled to a fixed size through the both electrode plates 21 and 22 by means of pressure pins provided on the mold in order to stabilize internal resistance. Applied pressure is set to be of about 20 to 50 kg/cm$^2$ considering variation in a thickness of the stacked element 20. While applying the pressure to the stacked element 20, molten heat-resistant PPS (polyphenylene sulfide) 23, which is a thermoplastic resin, is injected into the mold through a gate 24 for injecting the resin under injection pressure of about 80 kg/cm$^2$, hardened under cooling to be molded and packaged. After molding, the pressure pins are removed to leave holes 25 in their places. After molding and packaging, the lead terminals 21a and 22a protruded from the resin package are subjected to a folding or bending process and are recessed in recess portions 23a for receiving the outer lead terminals so that the capacitor is easily surface-mounted on, for instance, a printed circuit board. The lead terminals after being folded are referred to as lead terminals 21b and 22b, respectively. The process for folding the lead terminals 21a and 22a and recessing the terminals in the recess portions 23a includes a step of strongly pushing the folded lead terminals on the resin package in order to control the thickness of the lead terminals protruded from the surface of the resin package to be of 0.15 mm or less. Thus, it is not practically admitted to control a thickness of the resin sandwiched between the lead terminals 21b and 22b and the first electrode plate 21 to be of 0.4 mm or less.

Figure 5A:
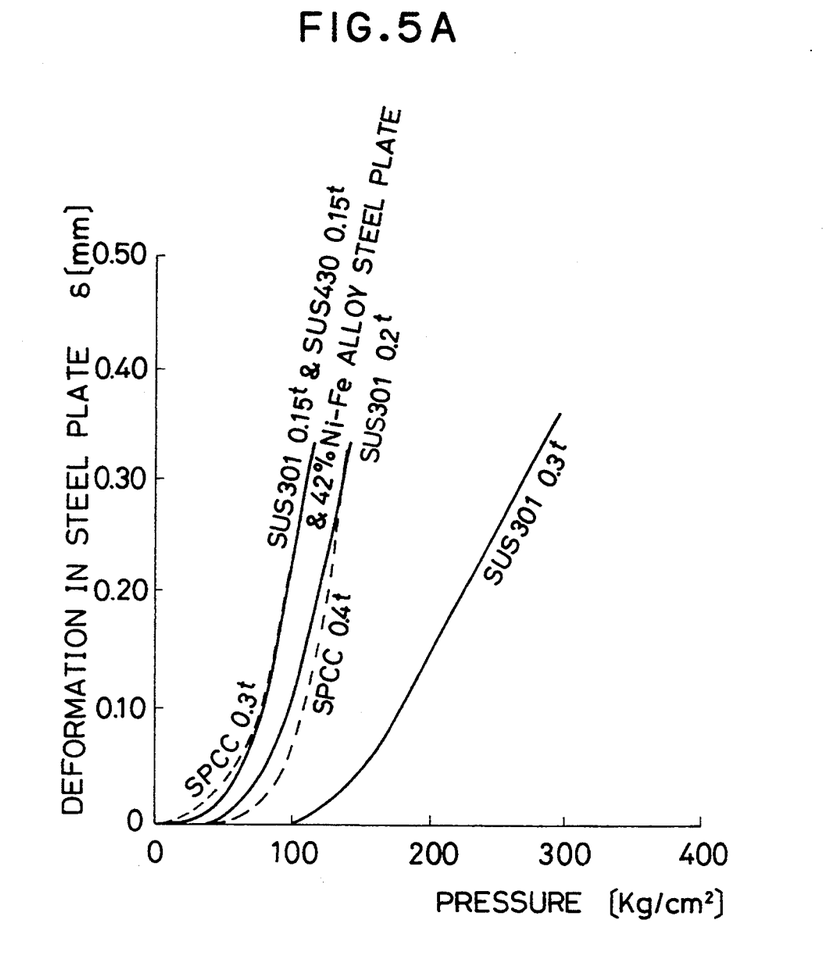
FIG. 5A is a graph showing a relation between pressures applied by imitated pressure pin jigs and deformation in several steel plates due to the pressures.
Figure 5B:
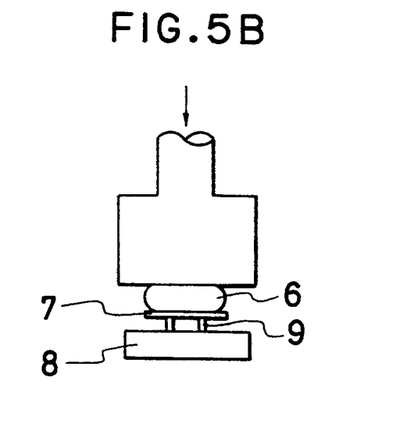
FIGS. 5B and 5C are diagrams for explaining a method of measuring deformation in the steel plate.
Figure 5C:
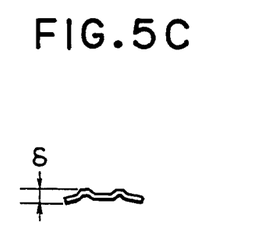

In the radial type electric double layer capacitor and the chip type electric double layer capacitor as shown in FIGS. 3A to 3D and 4A to 4F, respectively, a cold-rolled steel plate such as SPCC 0.3$^t$ (0.3 mm in a thickness) to 0.4$^t$ (0.4 mm in a thickness) as defined in JIS G 3141 was used as a material for the electrode plate since it is necessary to control deformation δ in the steel plate to be 0.2 mm or less even if the pressure (about 20 to 50 kg/cm$^2$) for stabilizing the internal resistance and the pressure (about 50 kg/cm$^2$ and about 80 kg/cm$^2$) for injecting the respective resins are applied to the steel plate, as shown in FIG. 5A. FIG. 5A is a graph showing a relation between pressures (kg/cm$^2$) applied by imitated pressure pin jigs and deformation δ (mm) in several steel plates due to the pressures. As shown in FIG. 5B, a steel plate 7 under test is placed between the stacked element 6 shown in FIG. 1 and an imitated mold 8 provided with imitated pressure pin jigs 9, and pressures are applied to the steel plate 7 from an upper side of the stacked element 6 by means of a pressurizer. Then, the steel plate 7 is withdrawn to measure the deformation δ in the steel plate as shown in FIG. 5C.

In association with a recent rapid advance in reduction of electronic equipments in size, particularly in reduction of portable equipments in size, demand for shrinking electronic parts and reducing a mounting area has been increased. In the conventional radial type and chip type electric double layer capacitors, SPCC (cold-rolled steel plate) has been used as a material for the electrode plate having the lead terminal. Thus, the thickness of the electrode plate must have fallen within the range of 0.3 to 0.4 mm. Now, thinning of the thickness of the molding resin causes an increase in pressure for injecting the resin into a mold, to thus be related to thickening of the electrode plate made of SPCC. Therefore, it was difficult to reduce the thickness of the completed electric double layer capacitor in terms of a package structure.

SUMMARY OF THE INVENTION

Accordingly, an object of this invention is to provide an electric double layer capacitor in which a shape thereof, particularly a thickness thereof, is shrunk and thus a mounting area is reduced.

According to this invention, there is provided an electric double layer capacitor having an electric double layer capacitor element, and a pair of upper and lower electrode plates located on opposite polar faces of the electric double layer capacitor element and having lead terminals protruded from the electrode plates, respectively, the electric double layer capacitor element being held by application of a prescribed pressure thereto through the upper and lower electrode plates and a periphery of the electric double layer element and electrode plates being mold-packaged by an insulative resin, comprising the electrode plates made of a stainless steel plate or 42% nickel-iron steel plate.

In a preferred embodiment of this invention, the stainless steel plate and 42% nickel-iron steel plate are plated with solder.

In another preferred embodiment of this invention, the electric double layer capacitor is of a radial type in which the lead terminals are taken out from the same side of a package and a chip type in which the outer lead terminal portions are folded to thus permit surface-mounting of the capacitor, the electric double layer capacitor element and the electrode plates being mold-packaged with a thermoplastic resin as an insulative resin.

In the present invention, the term "electric double layer capacitor element" means a single unitary electric double layer capacitor element and a stacked element comprising at least two unitary electric double layer capacitor elements, unless otherwise indicated.

The foregoing and other objects and features of the present invention will be apparent from the following description.

BRIEF DESCRIPTION OF THE DRAWINGS

FIGS. 3A to 3D are views for explaining an example of a conventional radial type electric double layer capacitor in which

FIGS. 4A to 4F are views for explaining an example of a conventional chip type electric double layer capacitor in which FIG. 4B is an underside view thereof.

FIGS. 6A to 6C are views for explaining an embodiment of a radial type electric double layer capacitor according to this invention in which FIGS. 7A to 7E are views for explaining an embodiment of a chip type electric double layer capacitor according to this invention in which

DETAILED DESCRIPTION OF THE PREFERRED EMBODIMENTS

Next, preferred embodiments of this invention will be hereinafter be described in more detail with reference to the following non-limiting embodiments as shown in the accompanying drawings, and the effects practically achieved by this invention will also be discussed in detail in comparison with examples of the prior art.

Figure 6A:
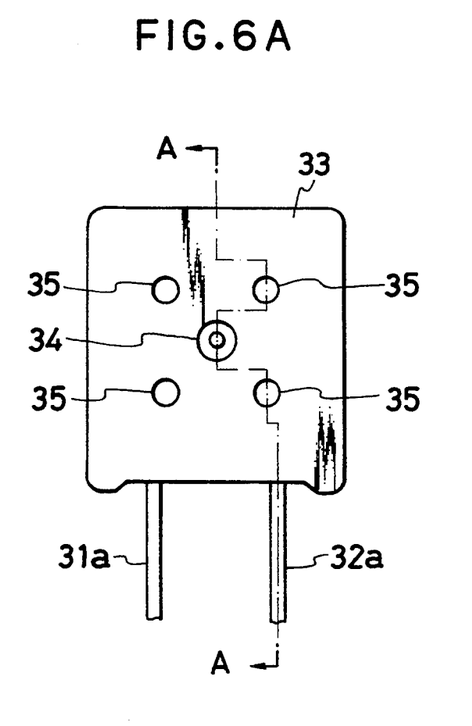
FIG. 6A is a front view thereof.
Figure 6B:
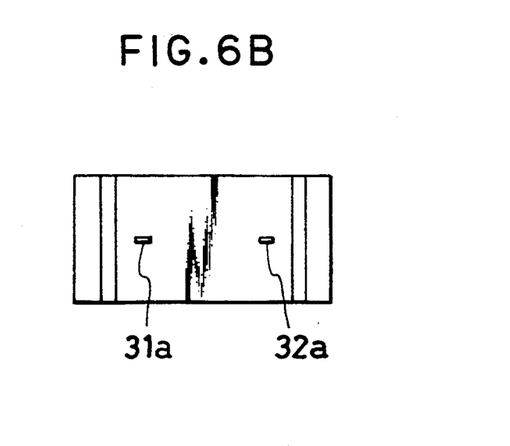
FIG. 6B is an underside view thereof and FIG. 6C is a cross-sectional view taken along a line A—A of FIG. 6A.
Figure 6C:
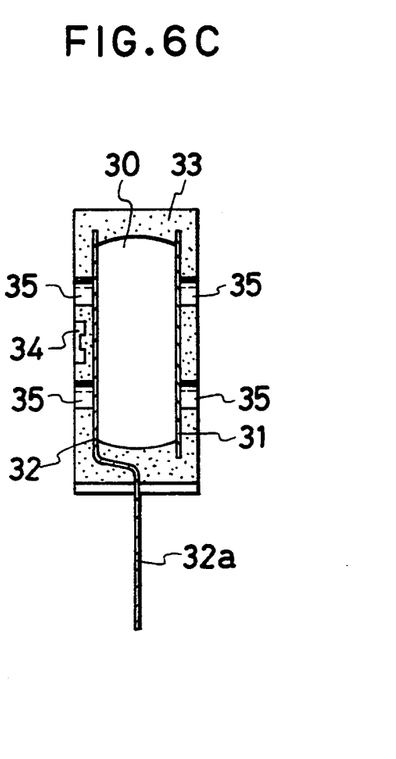

Referring now to FIGS. 6A to 6C, there are shown drawings for explaining an embodiment of a radial type electric double layer capacitor according to this invention, in which FIG. 6A is a front view of the electric double layer capacitor, FIG. 6B is an underside view thereof and FIG. 6C is a cross-sectional view taken along a line A—A of FIG. 6A.

As shown in those drawings, a stacked element 30 is sandwiched between a first octagonal electrode plate 31 and a second octagonal electrode plate 32, and the resulting assembly is placed in a mold and is controlled to a fixed size through the both electrode plates 31 and 32 by means of pressure pins (not shown) provided on the mold in order to stabilize internal resistance in the same manner as in the example of the prior radial type electric double layer capacitor as mentioned above. The stacked element 30 is similar to the stacked element used in the example of the prior radial type electric double layer capacitor as mentioned above. The octagonal electrode plates 31 and 32 have the distance between the opposite sides being 9.8 mm and a thickness of 0.15 mm, and further have lead terminals 31a and 32a each having a width of 0.5 mm and a thickness of 0.15 mm. The electrode plates 31 and 32 are disposed on opposite polar faces of the stacked element 30 so that each of the lead terminals 31a and 32a is arranged in the same direction with a lead pitch of 5.0 mm.

The electrode plates 31 and 32 each having the lead terminal are made of a stainless steel plate such as a stainless steel plate SUS430 (JIS G 4305), SUS301 (JIS G 4305) or the like, or 42% nickel-iron steel plate in place of SPCC used in the prior art, the stainless steel plates and nickel-iron steel plate having a primary nickel deposit and a solder deposit thereon to result in a thickness of 0.15 mm. As can be seen from data plotted in FIG. 5A showing a relation between pressures applied by the imitated pressure pin jigs provided on the mold and deformation $\delta$ in the steel plate due to the pressures, the deformation in the above-mentioned steel plates was 0.025 mm since the pressures of about 20 to 50 kg/cm$^2$ applied to the stacked element 30 by the pressure pins and the pressure of about 50 kg/cm$^2$ for injecting molten PBT resin 33 into the mold through an injecting gate 34 are applied to the stacked element 30 through the both electrode plates 31 and 32 as described in the example of the prior art. Therefore, the stainless steel plate such as SUS430, SUS301 or the like and 42% nickel-iron steel plate sufficiently met the requirement for deformation of 0.2 mm or less, and thus the stainless steel plates SUS430 0.15$^t$ (0.15 mm in a thickness) and SUS301 0.15$^t$ (0.15 mm in a thickness) and 42% nickel-iron steel plate were used in this embodiment.

Thereafter, applying of the pressure to the stacked element 30, injecting of the molten PBT resin 33 into the mold, hardening, molding and packaging were performed in the same manner as in the example of the prior art to assemble the radial type electric double layer capacitor having a length of 11.4 mm, a width of 10.4 mm and a thickness of 4.8 mm. After molding, the pressure pins were removed to leave holes 35 in their places.

Figure 7A:
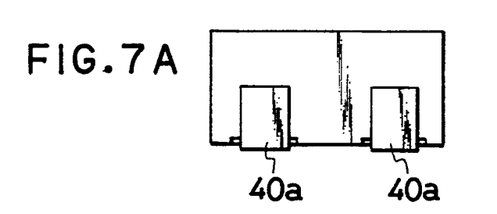
FIG. 7A is a top view thereof.
Figure 7B:
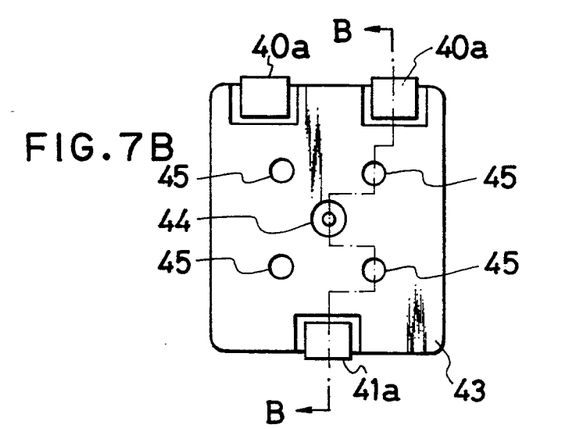
FIG. 7B is a front view thereof.
Figure 7C:
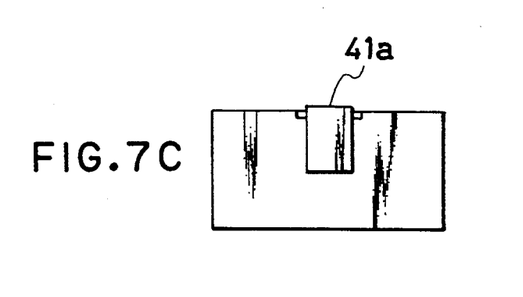
FIG. 7C is an underside view thereof.
Figure 7D:
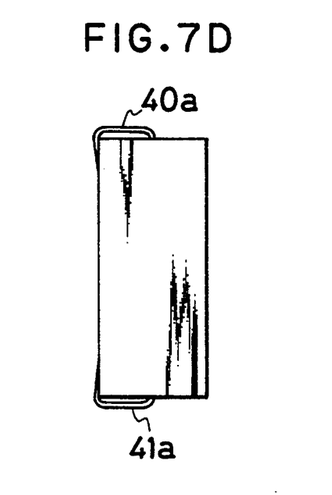
FIG. 7D is a right side view thereof and FIG. 7E is a cross-sectional view taken along a line B—B of FIG. 7B.
Figure 7E:
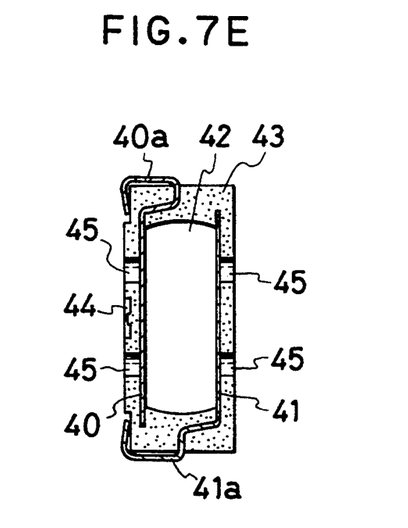

Referring now to FIGS. 7A to 7E, there are shown drawings for explaining an embodiment of a chip type electric double layer capacitor according to this invention, in which FIG. 7A is a top view of the electric double layer capacitor, FIG. 7B is a front view thereof, FIG. 7C is an underside view thereof, FIG. 7D is a right side view thereof and FIG. 7E is a cross-sectional view taken along a line B—B of FIG. 7B.

As shown in those drawings, a first electrode plates 40 having two lead terminals 40a of 12 mm in a width and 0.15 mm in a thickness at the same side and a second electrode plate 41 having a lead terminal 41a of the same width and thickness as the terminal 40a are disposed on opposite polar faces of a stacked element 42, which is similar to the stacked element used in the example of the prior chip type electric double layer capacitor as mentioned above, so that the respective lead terminals 40a and 41a are arranged on opposite sides with each other as shown in the drawings. The first and second electrode plates 40 and 41 are of an octagon-like shape which has the distance between the opposite sides being 9.8 mm and a thickness of 0.15 mm, and have the lead terminals 40a and lead terminal 41a protruded therefrom, respectively.

The electrode plates 40 and 41 are made of a stainless steel plate such as SUS430, SUS301 or the like, or 42% nickel-iron steel plate. As can been seen from data plotted in FIG. 5A, deformation in the steel plates was 0.10 mm since the pressure for injecting molten PPS resin 43 into a mold through an injecting gate 44 is about 80 kg/cm$^2$ as described in the example of the conventional chip type electric double layer capacitor as mentioned above. Therefore, the stainless steel plate such as SUS430, SUS301 or the like and 42% nickel-iron steel plate sufficiently met the requirement for deformation of 0.2 mm or less, and thus those steel plates were used in the present embodiment.

Thereafter, applying of the pressure to the stacked element 42, injecting of the molten PPS resin 43 into the mold, hardening, molding and packaging and further a folding process of the lead terminals 40a and 41a were performed in the same manner as in the example of the prior art to assemble the chip type electric double layer capacitor having a length of 12.0 mm, a width of 11.0 mm and a thickness of 4.55 mm. After molding, the pressure pins were removed to leave holes 45 in their places.

In the stacked element used in the above-mentioned embodiments, it is to be understood that the number of elements is not limited and may vary depending on a desired maximum permissible voltage.

The thickness of the electrode plates and that of the products in the embodiments of this invention were compared with those in the conventional examples as shown in the following Table.

|  | Radial Type | | Chip Type | |
| --- | --- | --- | --- | --- |
|  | Prior Art | This Invention | Prior Art | This Invention |
| Thickness of Lead Terminal and Electrode Plate | 0.4 mm | 0.15 mm | 0.3 mm | 0.15 mm |
| Thickness of Product | 5.3 mm | 4.8 mm | 5.0 mm | 4.55 mm |

As discussed above, according to this invention, as for the material of the electrode plate, the stainless steel plate and 42% nickel-iron steel plate are used in place of SPCC in the prior art, to thereby make it possible to reduce the thickness of the steel plates to be used to 0.15 mm while in the prior art the thickness of SPCC has needed from 0.3 to 0.4 mm. In addition, in the radial type electric double layer capacitor, it is possible to reduce the thickness of the product from 5.3 mm to 4.8 mm and thus reduce an area of mounting the product on a printed circuit board to 90% of that of the prior product.

Furthermore, in the chip type electric double layer capacitor, three times as much as the thickness of the electrode plate, i.e. the thickness of two electrode plates located on the opposite polar faces of the stacked element plus that of one electrode plate being folded in such a way that the product can be surface-mounted, are included in the total thickness of the product. Therefore, the effect exerted by reducing the thickness of the electrode plate from 0.3 mm in the prior art to 0.15 mm is three times as much as the conventional effect and thus it is possible to reduce the thickness of the product from 5.0 mm to 4.55 mm.

While this invention has been described in connection with certain preferred embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

What is claimed is:

1. An electric double layer capacitor having:
    an electric double layer capacitor element; and
    a pair of upper and lower electrode plates located on opposite polar faces of said electric double layer capacitor element and having lead terminals protruding from said electrode plates, respectively;
    said electric double layer capacitor element being held by an application of a prescribed pressure thereto through said upper and lower electrode plates:
    a periphery of said electric double layer element and electrode plates being mold-packaged by an insulative resin; and
    said electrode plates made of a material taken from a group consisting of S30100, S43000 and Ni-Fe steel including 42% by weight of Ni;
    whereby a thickness of said electric double capacitor is greatly reduced.

2. The electric double layer capacitor as defined in claim 1, wherein said insulative resin is a thermoplastic resin.

3. The electric double layer capacitor as defined in claim 1, wherein said electric double layer capacitor element comprises a single unitary electric double layer capacitor element.

4. The electric double layer capacitor as defined in claim 1, wherein said electric double layer capacitor element comprises a stacked element including at least two unitary electric double layer capacitor elements.

5. The electric double layer capacitor as defined in claim 1, wherein said capacitor is of a radial type.

6. The electric double layer capacitor as defined in claim 1, wherein said capacitor is of a chip type.

7. The electric double layer capacitor as defined in claim 1, wherein each of said electrode plates has a solder deposit thereon and has a thickness of about 0.15 mm.

8. In an electric double layer capacitor comprising a stacked element including at least two unitary electric double layer capacitor elements, a pair of upper and lower electrode plates located on opposite polar faces of said stacked element and having lead terminals protruding from said electrode plates, and an insulative resin package layer enclosing both said stacked element and said electrode plates, a portion of the protruding lead terminals extending through said resin package, said stacked element being held by an application of a prescribed pressure thereto through said electrode plates, the improvement wherein said electrode plates having said lead terminals are made of a nickel-iron steel plate including 42% by weight of nickel having a solder deposit thereon and having a thickness of about 0.15 mm.

* * * * *